Patented Dec. 17, 1940

2,225,061

UNITED STATES PATENT OFFICE 2,225,061

ANTHRAQUINONE DYESTUFFS

Frank Lodge, Blackley, Manchester, England, assignor to Imperial Chemical Industries Limited, a corporation of Great Britain No Drawing. Application October 19, 1937, Serial No. 169,885. In Great Britain October 28, 1936

3 Claims. (Cl. 260—373)

This invention relates to new anthraquinone dyestuffs.

According to the specification of British Patent No. 274,211 anthraquinone compounds are obtained when the boric acid ester of 1:5-dihydroxy-4:8-diaminoanthraquinone-2:6-disulphonic acid is treated with an aromatic hydroxy compound as such or in the form of its ether in concentrated sulphuric acid solution. The resulting compounds are formulated as addition compounds typified by

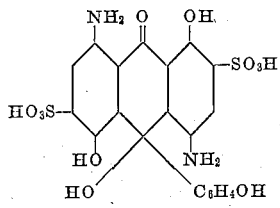

which stands for the product obtained with phenol and 1:5-dihydroxy-4:8-diaminoanthraquinone-2:6-disulphonic acid. When treated with dilute aqueous acid or alkaline reacting substances they are transformed into other compounds similarly typified by

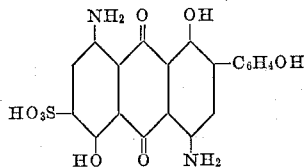

These other compounds are valuable dyestuffs, which dye unmordanted wool in beautiful blue shades of great fastness to light, perspiration and alkali. The aromatic hydroxy compounds which are specifically mentioned are phenol, resorcin, pyrocatechin, hydroquinone, phenetol, anisol, naphthols, guaiacol, veratrol, diphenyl ether and chlorophenols.

This invention has as an object to provide new anthraquinone dyestuffs. A further object is to devise a method of manufacturing new anthraquinone dyestuffs. Further objects will appear hereinafter.

These objects are accomplished by the following invention. I have now found that dyestuffs possessing better fastness to milling and severe washing than those described in British specification No. 274,211 are obtained by reacting, in concentrated sulphuric acid, the boric acid ester of 1:5-dihydroxy-4:8-diaminoanthraquinone-2:6-disulphonic acid with an alkylphenol, or phenol alkyl ether in which the alkyl group has 4 to 18 carbon atoms, or an ether of the said alkylphenol, and then treating the resulting product with a dilute aqueous acid or alkaline reacting substance.

n-Butylphenol, sec.-dodecylphenol and cetylphenol are examples of suitable alkyl phenols. Resorcinol dibutyl ether, resorcinol monododecyl ether, dodecyl phenyl ether and cetyl phenyl ether, are examples of suitable ethers of alkylphenols. Methoxy dodecylbenzene is an example of a suitable ether of an alkylphenol.

The alkylphenols may be made by reacting a phenol and an alcohol in which the alkyl group has 4–18 carbon atoms, in the presence of a catalyst, such as zinc chloride. The phenol alkyl ethers and ethers of alkylphenols may be made in the same way as the known similar methyl ethers, except that alcohols containing alkyl groups with 4–18 carbons atoms are used. The alcohols which may be used include, for example, butyl, amyl, isoamyl, hexyl, octyl, decyl (otherwise known as decanol), dodecyl, tetradecyl, hexadecyl and octadecyl alcohols. Hexadecyl alcohol is the main or sole component of the alcohols obtained by the saponification of spermaceti, and its purity may depend upon the purity of the spermaceti. Dodecyl and tetradecyl alcohols may be obtained by the reduction of the mixed fatty acids obtained from coconut oil and palm oil. Other alcohols are likewise obtainable by the reduction of the fatty acids of natural fats and oils (see, for instance, Bouveault and Blanc, Bull. Soc. Chem., series 3, vol. 31, pages 674 et seq. and 1210 et seq.) The alcohols include mixed alcohols, for instance, technical "lorol" which consists of the mixed alcohols from coconut oil fatty acids. The alkylphenols include those specifically described in the above-mentioned specification, although these may not always be pure compounds or single chemical compounds.

The following examples in which parts are by weight illustrate but do not limit the invention.

Example 1

20 parts of 1:5-dihydroxy-4:8-diaminoanthraquinone-2:6-disulphonic acid, 200 parts of 98% sulphuric acid and 10 parts of boric acid are stirred at 60° C. until solution is complete. The blue solution is cooled to 5° C. and 18 parts of sec.-dodecylphenol (obtained by heating dodecyl alcohol and phenol with zinc chloride) are added. The mixture is stirred at 5 to 10° C. for 18 hours after which time it has thickened somewhat and the colour changed from blue to dull violet. It is poured into 2500 parts of ice-water and the greenish solution heated to 100° C. and held at this temperature for 3 hours. After cooling to 90° C. 250 parts of sodium chloride are added and the precipitated dyestuff filtered cold. It is purified by neutralising with sodium hydroxide in 1500 parts of water at 80° C., adding 30 parts of sodium chloride, cooling to 20° C., filtering and washing with 2% sodium chloride solution.

When dry, the new dyestuff is blue, soluble in concentrated sulphuric acid with a pale brown colour, changing to blue on addition of boric acid. It dissolves in water to a bright blue solution, which froths on shaking. The dyestuff dyes wool from a neutral or weakly acid bath in blue shades of very good fastness to severe washing, milling and light. It has the probable formula

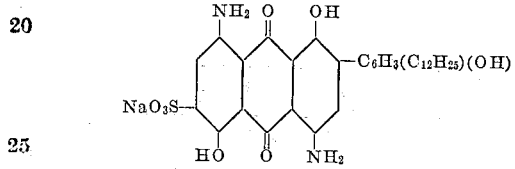

In like manner by using 24 parts of sec.-cetyl-phenol instead of the sec.-dodecylphenol a blue dyestuff of similar properties is obtained.

Example 2

20 parts of 1:5-dihydroxy-4:8-diaminoanthraquinone-2:6-disulphonic acid, 200 parts of 98% sulphuric acid, and 10 parts of boric acid are stirred together at 60° C. until solution is complete. After cooling to 5° C. 18 parts of dodecyl phenyl ether prepared from sodium phenate and dodecyl bromide (see Duzee and Adkins, J. Amer. Chem. Soc., 57, p. 150) are added and the temperature allowed to rise to 25° C. After stirring at this temperature for 18 hours, the mixture is poured into 1200 parts of ice-water and made alkaline by addition of 650 parts of 32% sodium hydroxide solution. The violet coloured solution is heated to 95° C. for 15 minutes when transformation to dyestuff is complete and a bright blue solution formed. The latter is treated with 160 parts of sodium chloride, cooled to 20° C., filtered and the cake washed with 2% sodium chloride solution. It is purified by dissolving in 2500 parts of water, adding 50 parts of sodium chloride, cooling, filtering and drying.

The new dyestuff dissolves to a bright blue solution in water which froths on shaking. The dyestuff dyes wool from a neutral or weakly acid bath in blue shades of similar properties to the dyestuff of Example 1. It has the probable formula

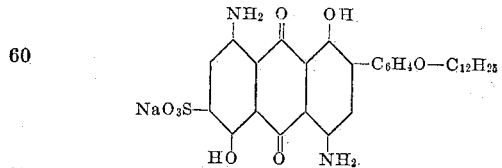

In like manner by using 24 parts of cetyl phenyl ether instead of the dodecyl phenyl ether a blue dyestuff of similar properties is obtained.

Example 3

10 parts of 1:5-dihydroxy-4:8-diaminoanthraquinone-2:6-disulphonic acid, 100 parts of 98% sulphuric acid and 5 parts of boric acid are stirred at 60% C. until solution is complete. After cooling to 5° C., 15 parts of resorcinol dibutyl ether (obtained by heating the disodium salt of resorcinol with excess of n-butyl bromide) are added. The mixture is stirred at 5° C. for 1 hour, during which time the colour changes from blue to brown. The mixture is then poured into 1000 parts of water, boiled for 3 hours and filtered at 60° C. The residue is neutralised with caustic soda in 700 parts of water at 90° C. and the new dyestuff precipitated by adding 35 parts of sodium chloride. It is filtered cold, re-dissolved in water and salted out again with sodium chloride.

The new dyestuff is dark blue; it yields a brown solution in concentrated sulphuric acid and a bright blue frothy solution in warm water. It dyes wool from a neutral or weakly acid bath in bright blue shades of very good fastness to washing, milling and light. It has the probable formula

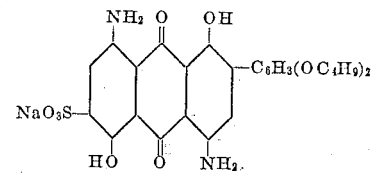

Example 4

10 parts of 1:5-dihydroxy-4:8-diaminoanthraquinone-2:6-disulphonic acid, 100 parts of concentrated sulphuric acid and 5 parts of boric acid are stirred together at 60° C. until solution is complete. The solution is cooled to 5° C. and 10 parts of resorcinol monododecyl ether (obtained by heating the mono-sodium salt of resorcinol with dodecyl bromide) are added. The mixture is stirred for 1 hour at 5° C., poured into 1000 parts of ice-water, boiled for 2 hours, 100 parts of sodium chloride added and the mixture then filtered cold; the filter-cake is washed with 5% sodium chloride solution and dried.

The dyestuff has very similar properties to those of Example 2. It has the probable formula

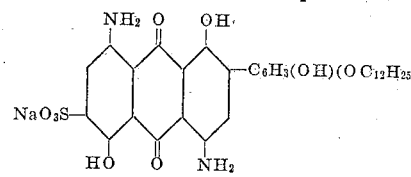

A similar dyestuff may be obtained by using resorcinol monocetyl ether instead of resorcinol monododecyl ether.

This invention is a valuable advance in the art as it discloses new dyestuffs which dye in beautiful blue shades of improved fastness to perspiration and alkali.

As many apparently widely different embodiments of this invention may be made without departing from the spirit and scope thereof, it is to be understood that I do not limit myself to the specific embodiments thereof except as defined in the appended claims.

I claim:

1. The compounds of the following general formula:

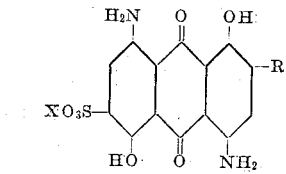

in which R is a substituent selected from the class consisting of phenyl radicals which carry an alkyloxy group, phenyl radicals which carry both an alkyl and a hydroxy group, and radicals which are ethers of said last named phenyl radicals, said alkyl groups having from 4 to 18 carbon atoms, and wherein X stands for an alkali metal.
2. The compound of the formula:
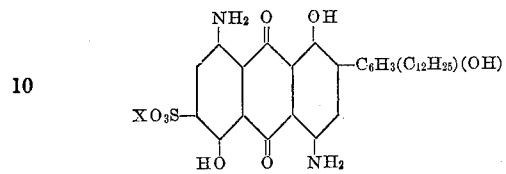
wherein X stands for an alkali metal.
3. The compound having the formula:
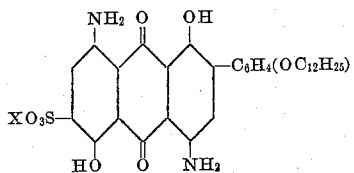
wherein X stands for an alkali metal.
FRANK LODGE.